Figure 1:
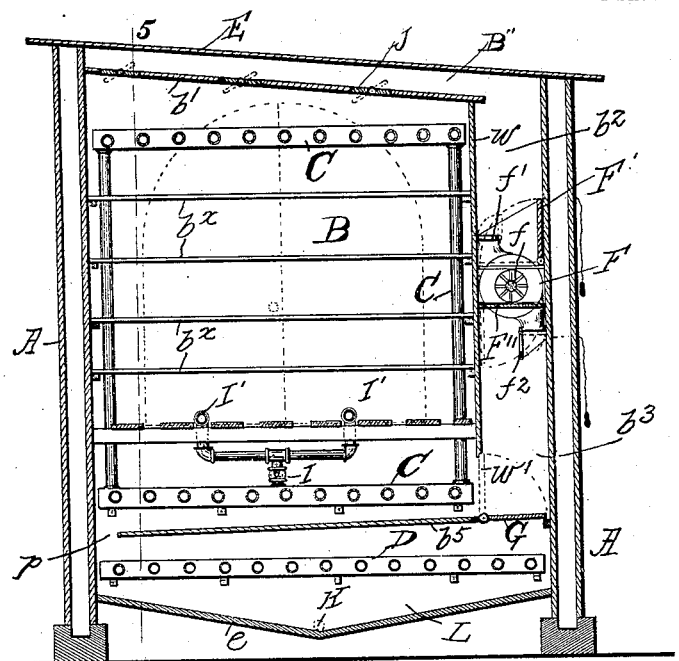

No. 763,387. PATENTED JUNE 28, 1904.
L. GATHMANN.
METHOD OF DRYING MATERIALS.
APPLICATION FILED FEB. 9, 1903.
NO MODEL. 2 SHEETS—SHEET 1.

Witnesses
Paul Gathmann
C. W. Hayes

Inventor
Louis Gathmann

No. 763,387. PATENTED JUNE 28, 1904.
L. GATHMANN.
METHOD OF DRYING MATERIALS.
APPLICATION FILED FEB. 9, 1903.
NO MODEL. 2 SHEETS—SHEET 2.
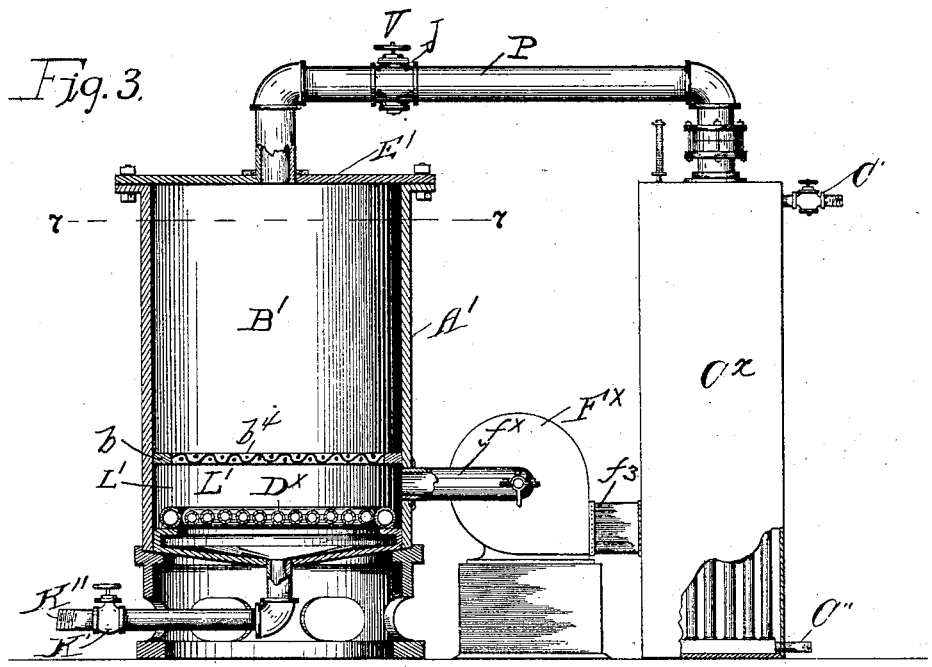
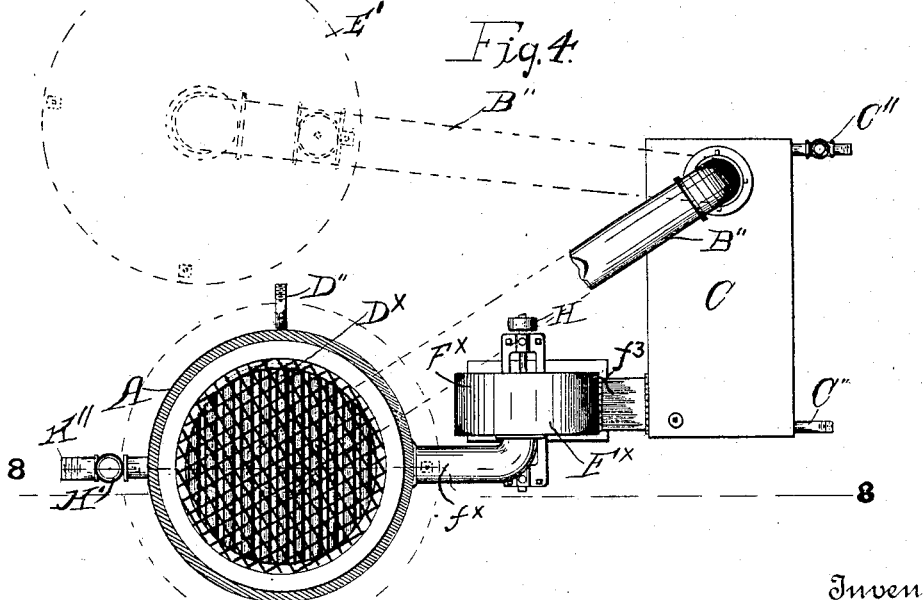
Witnesses
Paul Gathmann
Inventor
Louis Gathmann No. 763,387. Patented June 28, 1904.

UNITED STATES PATENT OFFICE.

LOUIS GATHMANN, OF WASHINGTON, DISTRICT OF COLUMBIA, ASSIGNOR OF ONE-FOURTH TO ELDRED P. DICKINSON AND SOMERSET R. WATERS, OF WASHINGTON, DISTRICT OF COLUMBIA.

METHOD OF DRYING MATERIALS.

SPECIFICATION forming part of Letters Patent No. 763,387, dated June 28, 1904.

Application filed February 9, 1903. Serial No. 142,653. (No specimens.)

*To all whom it may concern:*

Be it known that I, LOUIS GATHMANN, a citizen of the United States, residing at Washington, in the District of Columbia, have invented a certain new and useful Method of Drying Vegetable, Mineral, Animal, and Compound Substances, of which the following is a full, clear, and exact specification.

This invention has relation to the art of drying substances or materials in general, whether organic or inorganic, of natural or artificial provenance. In this art it has been common to make use of a closed circuit comprising, generally speaking, a drying-chamber, means to heat the air in the circuit to vaporizing temperature, means to cause the air to circulate in the circuit, and thereby vaporize the moisture in the substance or material contained in the drying-chamber, and a condenser to condense the vapors as they are evolved from the substance or material to be dried or substantially dried. In the drying of more or less bulky materials liable to be injuriously affected when subjected *ab initio* to a vaporizing temperature and with a view to heat them through and through before being subjected to a vaporizing heat and at the same time prevent surface drying it has been proposed to start the operation by first producing a vapor-laden atmosphere at a temperature below the boiling-point of water by causing the air in a closed circuit to absorb more or less steam while in circulation in said circuit and before it enters the drying-chamber, the moisture-laden atmosphere being then heated while in circulation to a vaporizing temperature, the circulation being kept up until the material to be dried has been heated through and through and has acquired the same temperature as the moisture-laden atmosphere and until the latter has become saturated by additional vapor evolved from the material being dried. When this point has been reached, the saturated air has been blown out of the circuit and fresh ambient air taken in, the operation being repeated until the material has been freed of its moisture and the moisture blown off.

It is obvious that in a method of drying such as last above referred to there is not only a great amount of heat lost by blowing it out of the circuit from time to time and reheating the ambient air taken in, so that a substantially saturated atmosphere at a vaporizing temperature cannot be constantly maintained in the circuit, while whenever ambient air is taken in the temperature of the vapor-laden atmosphere which may remain in the circuit, as well as the material to be dried, becomes chilled and condensation throughout the circuit is liable to result, necessitating the revaporization of the condensate and the reheating of the material to the desired degree and abnormally prolonging the operation of drying.

In those processes which are based upon the circulation of the drying medium in a closed circuit and the condensing of the vapors no means have been provided to produce a vapor-laden atmosphere in the drying-chamber.

Now my invention has for its object the combination of the two methods described, so improved that the loss of heat is minimized and the condensation of the vapors is regulated relatively to the heat required to restore the lost heat to the circulating medium, so as to maintain a substantially vapor-saturated atmosphere in the drying-chamber nearly to the ending of the operation of drying or until the vapors evolved from the substance or material to be dried become insufficient to saturate the air. I may produce the vapor-laden atmosphere in the drying-chamber by heating the substance or material and the air therein until sufficient vapor has been evolved from said substance or material to be dried, then cause the vapor-laden atmosphere to circulate in the circuit until it is saturated, lower the temperature of the saturated air to a condensing temperature after it leaves the drying-chamber, and restore the lost heat before it again enters the drying-chamber, and so regulate condensation relatively to the heat supplied as to cause the atmosphere to leave the drying-chamber in a saturated condition until near the end of the operation or until the vapors evolved from the material to be dried are insufficient to saturate the atmosphere, when said vapors may be condensed as fast as evolved until the material is thoroughly dried.

Instead of producing saturation of the air by circulation I may effect this in the drying-chamber by means of vapor evolved from the substance or material to be dried and then establish the circulation and proceed with the condensation as above set forth, or I may produce the initial vapor-laden atmosphere by admitting vapor, as steam, to the drying-chamber, then heat the vapor-laden atmosphere to a vaporizing temperature, establish the circulation, and proceed with the condensation as above set forth.

The various modes of procedure described will depend upon the substance or material to be dried—as, for instance, upon the percentage of moisture contained in such substance or material or the bulk thereof, or both—and also upon the physical character of the substance or material.

By the described process I am not only enabled to greatly expedite the operation of drying, but also to prevent surface drying before the substance or material is heated through and through to a vaporizing temperature, while the loss of heat is minimized.

Any suitable apparatus may be employed in carrying out my process, and in the accompanying drawings I have shown two forms of apparatus, which I do, however, not desire to claim herein, as they form subject-matter of separate applications for patents, filed, respectively, October 1, 1903, Serial No. 175,339, and December 5, 1903, Serial No. 183,952.

Figure 2:
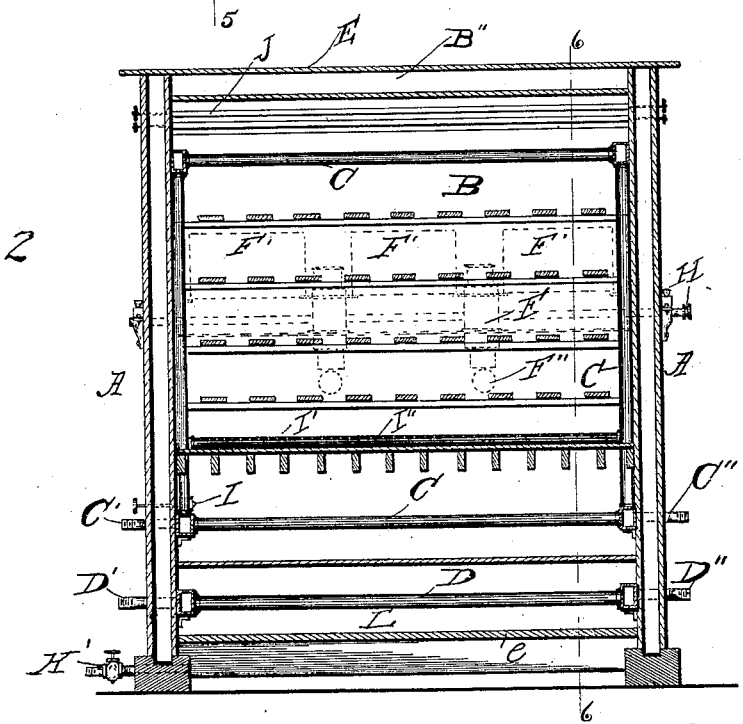

In said drawings, Figure 1 is a vertical transverse section on line 6 6 of Fig. 2, which latter is a longitudinal transverse section on line 5 5 of Fig. 1 of one form of apparatus. Fig. 3 is a vertical sectional view on line 8 8 of Fig. 4, which latter is a horizontal sectional view on line 7 7 of Fig. 3, parts being shown in dotted lines.

Referring to Figs. 1 and 2, A A indicate the vertical walls of the apparatus; E, the roof; $e$, the reversely-inclined bottom or floor, having at its deepest point an outlet-port K in communication with a valved exhaust-pipe K', Fig. 2. In this structure is built or arranged a drying-chamber B of less dimensions and so as to leave a clear space at top, bottom, and on one side. The drying-chamber B has an inclined bottom $b^5$ extending from its inner wall nearly to its outer wall, so as to form a port $p$, which places the drying-chamber in communication with the housing-space L below it, in which space or chamber L is arranged a heater-condenser D, of any suitable or preferred construction, preferably in the form of a series of parallel tubes connected to suitable headers at either end and suitably connected with feed and exhaust pipes for feeding a heating or cooling fluid thereto and exhausting the same therefrom. The space above the roof $b'$ of the drying-chamber forms a flue B'', said roof $b'$ having longitudinal ports controlled by dampers J, and said flue communicates with the space between the inner wall $w$ of the drying-chamber and the housing-wall A. This vertical space also constitutes a flue and is divided into two flue-sections $b^2$ $b^3$ by a partition which supports one or more fan-blowers, according to the length of the chamber B, two being shown in dotted lines in Fig. 2 and one of them in full lines in Fig. 1, the casings F of said fan-blowers having axial intake-ports and discharge-pipes projecting upwardly and downwardly into flue-sections $b^2$ $b^3$, respectively, each of said discharge-pipes being provided with a valve or gate, (respectively indicated by the symbols $f'$ and $f^2$.) In the partition openings are provided controlled by gates F' and F'', the former arranged above the axial intake of the fan-casings F and the latter below said intakes, whereby I provide means for reversing the circulation. If, as shown in Fig. 1, the valves $f'$ and gates F'' are closed, valves $f^2$ and gates F' being open, air will be taken from the upper flue-section $b^2$, discharged into the lower flue-section $b^3$, forced through ports $w'$ at the foot of its inner wall $w$ into the drying-chamber, thence through ports in its roof $b'$, controlled by valves J, and by way of flue B'' back to flue-section $b^2$. If, on the contrary, valves $f'$ and gates F'' are open and valves $f^2$ and gates F' closed, air will be taken from the lower flue-section $b^3$, discharged into upper flue-section $b^2$, forced through flue B'', ports in roof $b'$ of drying-chamber B, thence through ports $w'$ at the foot of wall $w$ of said drying-chamber back into lower flue-section $b^3$. In the bottom of the lower flue-section $b^3$ are formed ports controlled by dampers G, which also control the ports $w'$ in wall $w$ of the drying-chamber, so that by more or less opening the dampers ports $w'$ will be more or less closed or completely closed. I am thus enabled to regulate the volume of vapor-laden air flowing to the drying-chamber and to the heating condensing-chamber L, which forms a by-pass leading from the lower flue-section $b^3$ to the lower part of the drying-chamber, or vice versa, and by means of the dampers J, I am enabled to direct the flow of vapor-laden air through the drying-chamber, according as one or more of the dampers on either side of the central closed dampers are open. In the drying-chamber B is arranged a tubular heater or radiator C, whose upper and lower rows of horizontal tubes, which extend the full length of the chamber, are connected to headers, which latter are connected to downtakes, suitable means being provided, as usual, to feed a heating agent, as steam, to and exhaust said agent from the heater, said upper and lower rows of tubes being shown as arranged above and below the upper and lower foraminous shelves $b^x$ in said drying-chamber. Any other suitable arrangement of heating appliance capable of restoring the lost heat to the vapor-laden atmosphere and maintaining it at a vaporizing temperature in the drying-chamber may, however, be made use of. In said drying-chamber, below the lower shelf thereof, I arrange a jet-pipe I' in communication with a steam-supply pipe I for injecting steam into the drying-chamber.

Referring to Figs. 3 and 4, A' indicates the drier, B' the drying-chamber, near the lower end of which is arranged a foraminous partition $b$, on which the substance or material to be dried is placed, and below said ledge is located the heater-condenser $D^x$, supplied with a heating or cooling agent through pipe D' and exhausted through pipe D''. The lower head of the drier is conical and has connected thereto at its deepest point a valved exhaust-pipe K'' for the discharge of condensate. Below the ledge $b$ the drying-chamber B' is connected to the intake $f^x$ of the casing $F^x$ of a fan-blower, the outtake $f^3$ of said fan-casing being connected to the heating-space of a heater $C^x$, to which a heating agent, as steam, is fed through valved pipe C' and exhausted through pipe C'', which may be a return-pipe to the boiler. (Not shown.) The upper head E' of the drier A' is connected by pipe P, provided with a cut-off valve V, to the upper end of the heating-space in heater $C^x$, said pipe P being swiveled to the heater connection, so that said head E' can be turned off the heater A', as shown in dotted lines in Fig. 4, for the introduction of the substance or material to be dried into the drying-chamber B'.

In the construction of apparatus shown in Figs. 3 and 4 the lower part L' of the drying-chamber B' also forms a heating condensing-chamber, and said drying-chamber can be cut out of the circuit by closing valve V, in view of the fact that the substance or material to be dried will practically form a bottom for said chamber, through which bottom heat can, however, pass or rise into the chamber.

The operation of the apparatus is as follows, reference being more particularly had to Figs. 3 and 4: After the substance or material has been placed in the drying-chamber B' and the latter closed and cut out of the circuit by closing the valve V a vapor-saturated atmosphere is produced in said drying-chamber, and this may be done in various ways:

First. By supplying a heating agent to heater-condenser $D^x$ and heating the substance or material to be dried and the air in the drying-chamber until said air has taken up sufficient vapor to become saturated, or, in other words, to have reached the dew-point, a heating agent being meanwhile supplied to heater $C^x$. The circuit through the drying-chamber is then established and the saturated air caused to circulate in the circuit downwardly through the drying-chamber and through the heating condensing-chamber L', Figs. 3 and 4, thence through the fan-blower, heater $C^x$, pipe P, back to drying-chamber B', the temperature in the heating condensing-chamber having meanwhile been lowered to condense some of the vapors, the lost heat being restored to the vapor-laden atmosphere during its passage through the heater $C^x$ to maintain it at a vaporizing temperature, so that it will again become substantially saturated with vapor evolved from the substance or material to be dried during its passage therethrough. This is continued, the temperature in the heating condensing-chamber being gradually lowered in accordance with the reduction in the volume of moisture vaporized in the substance or material, until the vapors evolved therefrom are insufficient to saturate the air, when the temperature in the chamber L' is reduced to such an extent as to condense the vapors substantially as fast as evolved until the substance or material is completely dried—that is to say, until condensation ceases.

Secondly. By heating the substance or material to be dried and the air confined in the drying-chamber by means of heat radiated from the heater-condenser $D^x$ until the air confined in the drying-chamber is more or less laden with vapor, then reëstablishing the circulation through the drying-chamber, while the temperature in the heating condensing-chamber remains unchanged, and causing the vapor-laden atmosphere to circulate in the circuit, wherein its temperature is raised to a vaporizing temperature by heat from the heater $C^x$, which circulation is kept up until the air becomes saturated with vapor, or, in other words, has reached the dew-point. Then the temperature in the lower part L' of the drying-chamber is lowered to condense vapor and the condensation continued as described under "first."

The mode of procedure described under "first" may be resorted to in the drying of materials or substances containing a comparatively large percentage of moisture, while the procedure under "secondly" may be resorted to in drying substances or materials containing a comparatively small percentage of moisture.

Thirdly. By proceeding as above described either under "first" or "secondly," with this exception, that steam is injected into the drying-chamber before circulation of the heated air is established by means such as shown in Fig. 1. This mode of procedure is more particularly applicable to the drying of substances or materials which are comparatively dense and more or less bulky or to more or less porous and bulky substances or materials which are also poor conductors of heat. In the drying of such substances it is of course of great advantage—in fact, absolutely necessary—to heat them through and through to a vaporizing temperature in a vapor-laden atmosphere to prevent surface drying, or, in other words, to begin the vaporization from the interior to the exterior of the substance or material to be dried, and thus prevent surface drying.

The heating of the material through and through is materially expedited by the means provided for reversing the flow of vapor-laden atmosphere, as shown in Figs. 1 and 2.

Having thus described my invention, what I claim as new therein, and desire to secure by Letters Patent, is—

1. Producing a vapor-laden atmosphere in a space containing the substance to be dried, causing the vapor-laden atmosphere to flow downwardly through said space and through a space on a lower level and back again to the first-named space, heating the atmosphere to a vaporizing temperature during circulation, maintaining the circulation until the atmosphere is saturated with vapor, then lowering the temperature of said atmosphere during its passage through the space on a lower level to a condensing temperature, restoring the lost heat to the atmosphere after it has left said lower space, and continuing these operations, under exclusion of ambient air, until the substance is substantially free from vaporizable matter, for the purposes set forth.

2. The method of drying, which consists in causing a drying medium to flow downwardly through a space containing the substance to be dried and through a second space on a lower level and back to the upper part of the first-named space, heating the said medium to a vaporizing temperature while in circulation, maintaining the latter until the medium is saturated with vapor, then reducing the temperature of the saturated medium to a condensing temperature during its passage through the space on a lower level, restoring the lost heat to the medium after it has left the last-named space, and continuing these operations under exclusion of ambient air until the substance to be dried is substantially free from vaporizable matter, for the purposes set forth.

3. The method of drying, which consists in first heating a drying medium while confined in a space containing the substance to be dried, then causing said medium to flow downwardly through said space and thence through a space on a lower level and back to the upper part of the first-named space, maintaining the circulation of the drying medium until it is saturated with vapor, then reducing its temperature during its passage through the space on a lower level, to a condensing temperature, restoring the lost heat to the drying medium after it has left said lower space and regulating the condensation to maintain the drying medium in a vaporous condition until the substance to be dried is freed from a portion of its vaporizable matter, then condensing the vapors, and performing these operations under exclusion of ambient air, for the purposes set forth.

4. The method of drying, which consists in first heating a drying medium to a vaporizing temperature while confined in a space containing the substance to be dried, then causing the so-heated medium to flow downwardly through said space and thence through a space on a lower level and back to the upper part of the first-named space, reducing the temperature of the medium to a condensing temperature during its passage through said space on a lower level, restoring the lost heat to the medium during its passage through the space containing the substance to be dried, and maintaining these operations until said substance is substantially free from vaporizable matter, for the purposes set forth.

5. The method of drying, which consists in causing a drying medium to continuously flow downwardly through a space containing the substance to be dried and back to said space, cooling a portion of said medium after it has moved out of contact with said substance, to condense a part of the vapors only, restoring the lost heat to the cooled portion of the drying medium before it again moves out of contact with the substance to be dried, maintaining these operations until said substance is freed from a portion of its vaporizable matter, then cooling all of the drying medium after it moves out of contact with the substance to be dried, and restoring its lost heat before it again moves out of contact with said substance, continuing the latter operations until the substance is substantially free from vaporizable components, and performing all of the recited operations under exclusion of ambient air, for the purposes set forth.

6. The method of drying, which consists in heating a drying medium to a vaporizing temperature, causing said medium to flow downwardly through a space containing the substance to be dried, thence in part through a space on a lower level and in part through a by-pass back to the upper part of the first-named space, reducing the temperature of the drying medium during its passage through said space on a lower level to a condensing temperature, restoring the lost heat to the drying medium after it has left said space on a lower level, maintaining these operations until the substance to be dried is freed from a portion of its vaporizable constituents, then causing the entire volume of the drying medium to flow from the upper space to the condensing-space and back to the upper part of the upper space until the substance to be dried is substantially free from vaporizable matter, and performing these operations under exclusion of ambient air, for the purposes set forth.

7. Causing a drying medium to flow downwardly through a space containing the substance or material to be dried and through a space on a lower level and back to the first-named space, and then in a reverse direction, heating said medium to a vaporizing temperature while in circulation, maintaining the described circulation, under exclusion of ambient air, until the medium is substantially saturated with vapor evolved from the substance or material to be dried, then causing said medium to continuously flow from the space containing the substance to be dried through the space on a lower level and back to the first-named space, lowering the temperature of the drying medium, during its passage through the space on a lower level, to a condensing temperature, restoring the lost heat to the drying medium after it has left the last-named space, and continuing these operations, under exclusion of ambient air, until the substance or material is substantially free from vaporizable matter, substantially as set forth.

LOUIS GATHMANN.

Witnesses:
EMIL GATHMANN,
PAUL GATHMANN.